United States Patent Office 3,770,812
Patented Nov. 6, 1973

3,770,812
CATALYTIC FORMATION OF DOUBLE BONDS
Alden E. Blood and Max Statman, Longview, Tex., assignors to Eastman Kodak Company, Rochester, N.Y.
No Drawing. Filed May 28, 1970, Ser. No. 41,578
Int. Cl. C07c 69/54
U.S. Cl. 260—486 D   12 Claims

ABSTRACT OF THE DISCLOSURE

In the iodine-catalyzed oxidative dehydrogenation of organic compounds, it has been found that the use of catalyst promoter compositions consisting essentially of about 0.01 to 1 percent by weight vanadia or iron oxide on an inert support increases conversions and yields at lower dehydrogenation temperatures.

---

This invention relates to a method of dehydrogenating organic compounds and more particularly to the iodine-catalyzed oxidative dehydrogenation of organic compounds using specific amounts of vanadia or iron oxide promoters.

The use of metal oxides in iodine-catalyzed oxidative dehydrogenation is not new to the prior art. U.S. Pat. No. 3,207,866, for instance, describes an oxidative dehydrogenation process using iodine wherein metals in groups I-A, I-B, II-A, III-A, and III-B, IV-A, IV-B, V-A, and VI-B, VII-B and VIII-B are used as promoters. Other prior art making similar disclosures include U.S. Pats. Nos. 3,207,811; 3,210,436; 3,251,899 and 3,251,900.

In these iodine-catalyzed oxidative dehydrogenation processes it is important that complete oxygen utilization is accomplished which, ordinarily, requires the use of temperatures in excess of 650° C. The presence of excess oxygen in the stream leaving the oxidation reactor promotes the formation of additional iodine which tends to react with the desired dehydrogenated product to form iodides. As is apparent, failure to completely utilize the oxygen employed in the dehydrogenation results in loss of yields and reduced conversion. Attempts to increase the utilization of oxygen at temperatures below 625° C. by increasing the organic compound to oxygen mole ratio, say even to 5:1, continue to leave substantial amounts of oxygen in the system.

An iodine-catalyzed oxidative dehydrogenation has now been found which not only provides better utilization of oxygen so as to give increased yields and conversions but in addition enables the use of lower dehydrogenation temperatures. In accordance with the process of the invention a dehydrogenatable organic compound in admixture with molecular oxygen and iodine is subjected to dehydrogenation at an elevated temperature in the presence of a catalyst promoter consisting essentially of about 0.01 to 1 percent, preferably about 0.08 to 0.2 percent, by weight vanadia ($V_2O_5$) or iron oxide ($Fe_2O_3$) on an inert support. For reasons yet to be fully understood the defined catalyst promoter with its small concentrations of vanadia or iron oxide surprisingly produces high organic recovery and conversion which gives higher yields even at temperatures below 625° C. and low organic compound to oxygen mole ratio. For instance, the process of the invention utilizing the defined catalyst promoter is capable of maintaining high oxygen utilization at a temperature of 550° C. and an organic compound to oxygen mole ratio of 3:1.

Exactly how the vanadia or iron oxide promotion functions is not known but it is unique, for the effect obtained shows no correlation with the metals of the Periodic Table including metals disclosed as useful promoters in iodine-catalyzed oxidative dehydrogenation processes. A total of over 40 other metals have been tested and none gave the same activity and effect upon oxygen utilization. These tests are also summarized in the working examples below. In addition, it is imperative that the concentration of vanadia or iron oxide on the support fall in the range of about 0.01 to 1 percent by weight. Concentrations of the metal oxides falling outside these ranges are incapable of providing the unexpected results achieved by the process of the invention.

The process of the invention can be applied to a great variety of dehydrogenatable organic compounds to obtain the corresponding unsaturated derivative thereof. Such compounds normally will contain from 2 to about 20 carbon atoms, at least one

grouping, i.e., adjacent carbon atoms each containing at least one hydrogen atom, a boiling point below about 350° C. and such compounds may contain in addition to carbon other atoms, e.g., hydrogen, oxygen, halogen, nitrogen and sulfur. Among the class of dehydrogenatable organic compounds which may be dehydrogenated in accordance with the present invention may be included alkanes, alkenes, alkyl halides, ketones, ethers, esters, aldehydes, organic acids (e.g., mono- and di-carboxylic acids), alkyl aromatic compounds, cycloalkanes, cyanoalkanes, and the like. Illustrative applications of the invention include:

| | To— |
|---|---|
| Methyl isobutyrate | Methyl methacrylate. |
| Methyl propionate | Methyl acrylate. |
| Methyl 2-methylpentanoate | Methyl 2-methylpentenoate. |
| Ethyl acetate | Vinyl acetate. |
| Ethyl isobutyrate | Vinyl methacrylate. |
| Cyclohexyl propionate | Phenyl acrylate. |
| Phenyl isobutyrate | Phenyl methacrylate. |
| Ethyl benzene | Styrene. |
| Cumene | a-Methyl styrene. |
| Cyclohexane | Benzene. |
| Ethyl cyclohexane | Styrene. |
| Isobutane | Isobutylene. |
| Propane | Propylene. |
| Butene-1 | Butadiene. |
| 2-methylbutene-1 | Isoprene. |
| Diethylbenzene | Divinylbenzene. |
| Methyl ethyl ketone | Methyl vinyl ketone. |
| Diethyl ketone | Divinyl ketone. |
| Cyclohexyl methyl ketone | Acetophenone. |
| Propionic acid | Acrylic acid. |
| Isobutyric acid | Methacrylic acid. |
| Succinic acid | Maleic anhydride. |
| 2-ethylhexanoic acid | 2-ethylhexenoic acid. |
| Butyric acid | Crotonic acid. |
| Isobutyronitrile | Methacrylonitrile. |
| Propionitrile | Acrylonitrile. |
| Propionaldehyde | Acrolein. |
| Ethyl chloride | Vinyl chloride. |

The invention is particularly useful in the preparation of vinylidene compounds containing at least one $CH_2=C<$ group, i.e., a compound having a terminal methylene group attached by a double bond to a carbon atom as, for instance, in the preparation of carbon atoms having the structure:

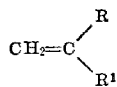

from the oxidative dehydrogenation of compounds having the structure:

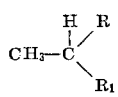

wherein R in the above structures is hydrogen, alkyl or aryl and $R^1$ in the above structures is hydrogen, alkyl, aryl, alkoxy, acyl and carboalkoxy.

The iodine passed with the organic compound to the oxidative dehydrogenation reaction to catalyze the reaction may be in the form of free iodine or an iodine-containing compound which liberates iodine under the dehydrogenation conditions. Suitable for use as the iodine source in the invention are, for example, iodine, hydrogen iodide, hydrogen iodide hydrates, alkyl iodide (preferably of 1 to 6 carbon atoms), ammonium iodide and the like. The preferred iodine catalyst for use in the process of the invention, however, is hydrogen iodide hydrate particularly the hydrogen iodide hydrate described in copending application Ser. No. 830,628, filed June 5, 1969.

The amount of iodine employed will vary widely but is always a concentration sufficient to provide a catalytic effect to the oxidative dehydrogenation reaction. Ordinarily, at least about 0.0001 mole iodine, such as at least about 0.001 mole or the equivalent amount of iodine-liberating material per mole of organic compound to be dehydrogenated, and more often at least about 0.01 mole equivalent of iodine per mole of organic compound will be employed. Preferred amounts of iodine fall in the range of about 0.001 to 0.09 mole per mole of the organic compound to be dehydrogenated, with the range of 0.001 to 0.05 being particularly preferred.

Oxygen may be supplied to the reaction system as pure oxygen or oxygen diluted with inert gases such as helium, carbon dioxide, nitrogen, etc.

Also, as one of the advantages of the invention, air may be used and still the desired conversion and yields obtained. The amount of oxygen used is at least about ¼ mole of oxygen per mole of organic compound to be dehydrogenated. In general, about ⅓ mole to 1 mole or more of oxygen per mole of organic compound are employed. The mole ratio of oxygen to iodine is usually greater than 1, preferably at least 3 and in most cases will fall in the range of about 5 to 300 moles of oxygen per mole of iodine.

The catalyst promoter composition employed in the process of the invention may be prepared by any of the conventional techniques familiar to those in the art of catalyst preparation. For instance, a suitable inert support having a surface area of between about 0.1 to 1.0 square meters per gram may be impregnated with an aqueous solution of a water-soluble salt of vanadium or iron such as, for instance, ammonium metavanadate, iron acetate, etc. and the impregnated support heated to dry the support and decompose the salt into vanadia or iron oxide. Drying temperatures of at least about 250° C., ordinarily up to 500° C., will usually provide the desired decomposition to the oxide form. As aforementioned, the concentration of vanadia and iron oxide on the support must be about 0.01 to 1 percent by weight of the support. In general, this concentration of vanadia or iron oxide may be achieved by using about 1 to 3 percent water-soluble salt solution.

The carrier for the vanadia or iron oxide in the catalyst promoter of the invention may be any suitable inert support. The support, however, should be relatively free of (i.e., have less than 1 percent by weight) other metal oxides which unduly, deleteriously affect the novel characteristic of the catalyst promoter in the process of the invention. Among the materials that may be used as a support for the vanadia and iron oxide components of the invention may be included alumina, preferably Alundum (a fused alumina), silica carbide, low surface area silica, silica-alumina, etc. The catalyst promoter composition of the invention may be employed in any particulate form, e.g. as pellets, tablets, extrudates and other particles.

The temperature of the oxidative dehydrogenation reaction may vary depending primarily upon the organic compound being dehydrogenated. In general, the temperature is at least about 400° to about 625° C. Although temperatures in excess of about 625° C. may be employed, such temperatures are ordinarily undesirable once they lead to excessive thermal decomposition. The preferred reaction temperature is about 550 to 615° C.

The dehydrogenation reaction is conveniently effected at atmospheric pressure but pressure in excess of atmospheric may be employed if desired. When pressures in excess of atmospheric are used they will usually be about 100 to 200 p.s.i.g. The partial pressure of the organic compound is normally equivalent to less than about ⅓ of the total pressure.

The reaction rates of the gaseous reactants may be varied quite widely and the desired results may be obtained with a contact time range of 0.25 to 5.0 seconds, with 0.9 to 1.5 seconds being preferred, at standard conditions.

Fixed bed reactors are the preferred reactor types for the oxidative dehydrogenation process of the invention, although moving and fluid bed systems may also be employed. Tubular reactors of large diameter which are packed or loaded with particles of the catalyst promoter are preferred.

The invention will be further illustrated by the following examples which will show the uniqueness of vanadia and iron oxide in giving good oxygen utilization and high conversions at lower operating temperatures.

EXAMPLE 1

Into a reactor consisting of 1-inch Vycor tube 28 inches long, loaded with Vycor chips, heated by an electric furnace at 610° C., at atmospheric pressure is fed methyl isobutyrate containing 2.0 percent hydrogen iodide together with air. The ratio of air to methyl isobutyrate is such as to give a 2:1 mole ratio of methyl isobutyrate to oxygen. The reaction mixture is fed at such a rate to give a space time of 1.1 seconds at operating conditions. The reaction products are passed through a chilled condenser. The liquid products contain 19 percent methyl methacrylate, 8 percent methyl acrylate, and 60 percent unreacted methyl isobutyrate. The conversion to methyl methacrylate is 17 percent, and the yield is 47 percent. The off gas contains 3.6 percent oxygen. Thus, this example illustrates the results to be expected when no promoter is utilized.

EXAMPLE 2

Alundum (fused alumina) pellets ⅛ x ⅛ inch having a surface area of less than 1 square meter per gram are soaked in a 2 percent solution of ammonium metavanadate. The support adsorbed solution in an amount to equal 16 percent of its weight. The soaked support is then dried in an oven at a temperature of 260° C.

EXAMPLE 3

The process described in Example 1 is repeated except that the support described in Example 2 is used instead of Vycor chips. The reactor product contains 26 percent methyl methacrylate, 9 percent methyl acrylate, and 58 percent unreacted methyl isobutyrate. The conversion to methyl methacrylate is 20 percent with a yield of 50 percent. The off gas contains less than 1 percent oxygen.

EXAMPLE 4

The process described in Example 3 is repeated except a temperature of 560° C. instead of 610° C. is used. The conversion is 19 percent with a yield of 65 percent. This example illustrates the effect of using promoted catalyst of the invention instead of an inert filling.

In the following examples hydrogen iodide hydrate is used as the catalyst. Various packings with and without the catalyst promoter of the invention are employed as the contact material. The use of various metals as promoters is also shown. These results will demonstrate the superior and unique results obtained with the process of the invention.

EXAMPLE 57

Methyl isobutyrate and air are fed to a reactor loaded with a support such as described in Example 2. The methyl isobutyrate to oxygen ratio is maintained at 3.5:1. The temperature is held at 575° C. and the catalyst level fed as a 20 percent hydrogen iodide-in-water solution based on methyl isobutyrate is 7.3 percent as hydrogen iodide. The contact time is held at 1 second. The recovered product contains 33.5 percent methyl methacrylate and 62.4 percent unreacted methyl isobutyrate. The conversion to methyl methacrylate is 32.0 percent, and the yield is 80.0 percent. There is less than 1 percent oxygen in the off gas.

TABLE I

| Example number | Support | Promoter | Temp., °C. | MIB[1]:O$_2$, mole ratio | Org. rec. | Percent MMA[2] | MIB[1] | Conversion | Yield | O$_2$ in off gas |
|---|---|---|---|---|---|---|---|---|---|---|
| 5 | Vycor | None | 650 | 5.3:1 | 86.7 | 16.8 | 81.0 | 14.8 | 49.8 | 3.4 |
| 6 | do | do | 625 | 5:1 | 93.5 | 11.5 | 86.7 | 11.8 | 56.5 | 8.3 |
| 7 | do | do | 600 | 5:1 | 98.7 | 7.3 | 91.3 | 7.3 | 74.0 | 12.8 |
| 8 | Alundum | do | 600 | 5.5:1 | 91.8 | 14.5 | 79.5 | 13.3 | 52.2 | 8.9 |
| 9 | do | 0.02% vanadium | 600 | 5:1 | 89.2 | 20.8 | 89.2 | 18.9 | 61.3 | 2.2 |
| 10 | do | 0.1% vanadium | 580 | 5:1 | 96.5 | 18.0 | 78.4 | 17.2 | 69.0 | 0.5 |
| 11 | do | do | 580 | 3.8:1 | 91.2 | 24.0 | 72.4 | 22.3 | 69.0 | 0.8 |
| 12 | do | 0.1% iron | 600 | 4:1 | 89.7 | 18.0 | 79.3 | 16.5 | 59.0 | 2.4 |
| 13 | do | 0.2% copper | 600 | 5:1 | 91.6 | 10.3 | 86.1 | 9.6 | 48.0 | 10.2 |
| 14 | do | 0.1% titanium | 600 | 5:1 | 91.5 | 13.0 | 84.3 | 11.8 | 50.0 | 6.0 |
| 15 | do | 0.1% osmium | 600 | 5.3:1 | 46.2 | 16.6 | 88.5 | 7.8 | 13.0 | 0.3 |
| 16 | do | 0.1% lanthanum | 600 | 5:1 | 82.2 | 20.6 | 76.6 | 17.2 | 48.0 | 0.6 |
| 17 | do | 0.1% tin | 600 | 5:1 | 77.6 | 18.9 | 78.2 | 14.9 | 39.0 | 0.5 |
| 18 | Silicon carbide | None | 600 | 5:1 | 91.1 | 14.2 | 82.8 | 13.2 | 58.0 | 2.4 |
| 19 | do | 0.12% vanadium | 600 | 5:1 | 92.8 | 18.0 | 77.0 | 17.3 | 76.0 | 0.3 |
| 20 | do | do | 575 | 5:1 | 96.7 | 17.2 | 79.3 | 17.0 | 81.3 | 0.6 |
| 21 | Zircon | 0.07% vanadium | 600 | 5:1 | 94.4 | 20.0 | 77.1 | 19.3 | 76.3 | 1.0 |
| 22 | Silica alumina | 0.08% vanadium | 575 | 5:1 | 95.7 | 16.6 | 79.5 | 16.2 | 72.3 | 0.9 |

[1] MIB=methyl isobutyrate. [2] MMA=Methyl methacrylate.

NOTE.—All examples run at 1 second contact time, using 20% HI in water solution as catalyst source, percent calalyst approximately 3% HI on methyl isobutyrate.

EXAMPLES 23 THROUGH 56

These additional runs were made in the same manner as Examples 9 through 11 to test other metals as promoters. The oxygen utilization was poor, i.e., over 3 percent oxygen in the off gas even at 600° C. The support was alundum in these examples.

TABLE II

| Example number | Metal | Percent Conversion | Yield | Oxygen in off gas |
|---|---|---|---|---|
| 23 | Bismuth | 11.5 | 49.7 | 5.7 |
| 24 | Manganese | 16.6 | 72.7 | 6.7 |
| 25 | Zinc | 9.7 | 56.0 | 9.9 |
| 26 | Silver | 10.3 | 62.2 | 10.2 |
| 27 | Cerium | 15.1 | 72.1 | 4.0 |
| 28 | Chromium | 16.6 | 72.5 | 3.1 |
| 39 | Cobalt | 14.3 | 59.0 | 3.8 |
| 30 | Nickel | 14.3 | 88.0 | 7.0 |
| 31 | Thorium | 11.7 | 70.0 | 5.2 |
| 32 | Tungsten | 9.0 | 54.0 | 6.2 |
| 33 | Dyprosium | 12.5 | 51.0 | 7.5 |
| 34 | Erbidium | 18.0 | 58.5 | 2.7 |
| 35 | Gadolinium | 12.5 | 61.0 | 8.2 |
| 36 | Holmium | 13.0 | 62.4 | 6.6 |
| 37 | Neodymium | 10.8 | 57.0 | 9.0 |
| 38 | Praseodymium | 16.5 | 65.0 | 3.2 |
| 39 | Samarium | 11.2 | 67.7 | 10.4 |
| 40 | Yattrium | 13.8 | 67.5 | 6.1 |
| 41 | Ruthenium | 17.2 | 63.2 | 3.6 |
| 42 | Zirconium | 17.3 | 67.2 | 3.9 |
| 43 | Barium | 16.6 | 53.0 | 1.8 |
| 44 | Calcium | 15.0 | 63.5 | 1.0 |
| 45 | Potassium | 9.7 | 67.4 | 11.1 |
| 46 | Magnesium | 12.9 | 54.1 | 5.3 |
| 47 | Sodium | 11.7 | 83.0 | 9.2 |
| 48 | Boron | 9.0 | 64.8 | 10.7 |
| 49 | Cadmium | 9.5 | 76.0 | 8.8 |
| 50 | Lead | 9.6 | 65.3 | 10.5 |
| 51 | Palladium | 13.9 | 77.3 | 9.2 |
| 52 | Platinum | 14.8 | 83.0 | 6.7 |
| 53 | Strontium | 12.4 | 69.8 | 5.5 |
| 54 | Uranium | 16.9 | 82.2 | 6.8 |
| 55 | Niobium | 18.7 | 74.6 | 4.5 |
| 56 | Molybdenum | 16.0 | 73.0 | 6.1 |

EXAMPLE 58

This example is operated in the same manner as Example 57 except the catalyst used is fed in the form of a 40 percent hydrogen iodide in water solution. The conversion in methyl methacrylate is 29.4 percent with a 73.4 percent yield. There is 0.6 percent oxygen in the off gas.

EXAMPLE 59

This example is operated in the same manner as Example 57 except the catalyst used is methyl iodide. The methyl iodide is fed so as to give 7.3 percent as iodine based on methyl isobutyrate. Water is added to give the same amount of water as fed during Example 57. The results are essentially the same as in Example 57.

EXAMPLE 60

This example is operated in the same manner as Example 58 except that the total iodine values consist of a 48 percent solution of hydrogen iodide containing 15 percent free iodine dissolved therein. The results are essentially the same as with Example 58.

All of the above examples show the oxidative dehydrogenation of methyl isobutyrate. To illustrate the application of our invention to other reactions, the following examples are given.

EXAMPLES 61 THROUGH 85

The organic reactant is fed with air at a 5:1 organic to oxygen mole ratio at a temperature of 575° C. and 1-second contact time. The catalyst used is hydrogen iodide fed as a 20 percent hydrogen iodide-in-water solution at a rate to give solution of 3.0 percent hydrogen iodide based on the organic feed.

TABLE III

| Ex. No. | Organic | Product | Percent Conversion | Yield |
|---|---|---|---|---|
| 61 | Methyl propionate | Methyl acrylate | 17.0 | 72 |
| 62 | Methyl 2-methylpentanoate | Methyl 2-methylpentenoate | 18.5 | 76 |
| 63 | Ethyl acetate | Vinyl acetate | 15.3 | 80 |
| 64 | Ethyl isobutyrate | Vinyl methacrylate | 7.0 | 46 |
| 65 | Cyclohexyl propionate | Phenyl acrylate | 8.2 | 36 |
| 66 | Phenyl isobutyrate | Phenyl methacrylate | 16.4 | 56 |
| 67 | Ethyl benzene | Styrene | 19.0 | 63 |
| 68 | Cumene | α-Methyl styrene | 18.0 | 57 |
| 69 | Cyclohexane | Benzene | 25.0 | 83 |
| 70 | Ethyl cyclohexane | Styrene | 14.0 | 54 |
| 71 | Isobutane | Isobutylene | 28.0 | 85 |
| 72 | Propane | Propylene | 32.0 | 87 |
| 73 | Butene-1 | Butadiene | 27.0 | 93 |
| 74 | 2-methylbutene-1 | Isoprene | 25.0 | 87 |
| 75 | Diethylbenzene | Divinylbenzene | 22.0 | 70 |
| 76 | Methyl ethyl ketone | Methyl vinyl ketone | 23.0 | 40 |
| 77 | Diethyl ketone | Divinyl ketone | 7.0 | 26 |
| 78 | Cyclohexyl methyl ketone | Acetophenone | 14.0 | 38 |
| 79 | Propionic acid | Acrylic acid | 17.0 | 65 |
| 80 | Isobutyric acid | Methacrylic acid | 22.0 | 75 |
| 81 | Succinic acid | Maleic anhydride | 34.0 | 85 |
| 82 | 2-ethylhexanoic | 2-ethylhexanoic | 15.0 | 51 |
| 83 | Butyric acid | Crotonic acid | 18.0 | 62 |
| 84 | Isobutyronitrile | Methacrylonitrile | 19.0 | 72 |
| 85 | Propionitrile | Acrylonitrile | 18.0 | 70 |

The invention has been described in considerable detail with particular reference to certain preferred embodiments thereof, but it will be understood that variations and modifications can be effected within the spirit and scope of the invention as described hereinabove and as defined in the appended claims.

We claim:

1. A method for dehydrogenating organic compounds which comprises subjecting a dehydrogenatable organic compound containing from 2 to about 20 carbon atoms and having the structure

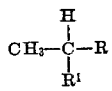

wherein R is hydrogen, alkyl or aryl and $R^1$ is hydrogen, alkyl, aryl, alkoxy, acyl or carboalkoxy in admixture with molecular oxygen and iodine to dehydrogenation at a temperature of at least 400° C. in the presence of a catalyst promoter consisting of about 0.01 to 1 percent by weight vanadia or iron oxide on an inert support.

2. The method of claim 1 wherein the catalyst promoter consists essentially of about 0.08 to 0.2% by weight vanadia or iron oxide on an inert support.

3. The method of claim 1 wherein the $R^1$ is carboalkoxy.

4. The method of claim 3 wherein the organic compound is methyl isobutyrate.

5. The method of claim 1 wherein the catalyst promoter consists essentially of about 0.01 to 1 percent by weight vanadia on an inert support.

6. The method of claim 1 wherein the inert support is alundum.

7. The method of claim 1 wherein the dehydrogenation temperature is about 400° C. to 625° C.

8. The method of claim 7 wherein the catalyst promoter consists essentially of about 0.08% to 0.2% by weight vanadia on an inert support.

9. The method of claim 8 wherein the $R^1$ is carboalkoxy.

10. The method of claim 9 wherein the organic compound is methyl isobutyrate.

11. The method of claim 1 wherein the inert support has a surface area of less than 1 square meter per gram and less than 1 percent by weight of other metal oxides.

12. The method of claim 1 wherein the contact time of the reactants with the catalysts is between about 0.25 to 5.0 seconds.

References Cited

UNITED STATES PATENTS

| 3,207,809 | 9/1965 | Bajars | 260—680 D |
| 3,530,169 | 9/1970 | Platz et al. | 260—486 |
| 3,308,193 | 3/1967 | Bajars | 260—486 D |

LORRAINE A. WEINBERGER, Primary Examiner

PAUL J. KILLOS, Assistant Examiner

U.S. Cl. X.R.

260—346.3, 465.9, 479 R, 491, 526 N, 593 R, 601 R, 656 R, 668 D, 669 R, 680 D, 683.3